(12) United States Patent
Kagan et al.

(10) Patent No.: US 8,443,221 B2
(45) Date of Patent: May 14, 2013

(54) METHODS, SYSTEMS, AND COMPUTER READABLE MEDIA FOR ADVANCED POWER MANAGEMENT FOR SERIAL ADVANCED TECHNOLOGY ATTACHMENT (SATA)-BASED STORAGE DEVICES

(75) Inventors: Yishai Kagan, Sunnyvale, CA (US); Ilya Shlimenzon, San Jose, CA (US)

(73) Assignee: SanDisk Technologies Inc., Plano, TX (US)

( * ) Notice: Subject to any disclaimer, the term of this patent is extended or adjusted under 35 U.S.C. 154(b) by 259 days.

(21) Appl. No.: 13/040,519

(22) Filed: Mar. 4, 2011

(65) Prior Publication Data

US 2012/0226927 A1 Sep. 6, 2012

(51) Int. Cl.
*G06F 1/32* (2006.01)
(52) U.S. Cl.
USPC ............ 713/323; 713/324; 711/111; 711/154
(58) Field of Classification Search .................. 713/323, 713/324; 711/111, 154
See application file for complete search history.

(56) References Cited

U.S. PATENT DOCUMENTS

| | | | |
|---|---|---|---|
| 6,744,687 B2 | 6/2004 | Koo et al. | |
| 6,850,453 B2 | 2/2005 | Park | |
| 6,914,844 B2 | 7/2005 | Suh | |
| 6,925,024 B2 | 8/2005 | Lovett et al. | |
| 7,057,960 B1 * | 6/2006 | Fiscus et al. | 365/222 |
| 7,184,354 B2 | 2/2007 | Song | |
| 7,328,356 B2 * | 2/2008 | Igari | 713/320 |
| 8,051,314 B2 * | 11/2011 | Huffman et al. | 713/323 |
| 8,181,042 B2 * | 5/2012 | Hobson | 713/300 |
| 8,250,393 B2 * | 8/2012 | Qin et al. | 713/320 |
| 2009/0019301 A1 | 1/2009 | Minami | |
| 2010/0058089 A1 | 3/2010 | Lerman | |
| 2010/0257390 A1 | 10/2010 | Okoge et al. | |

FOREIGN PATENT DOCUMENTS

EP 0 855 718 A1 7/1998

OTHER PUBLICATIONS

Notification of Trnasmittal of the International Search Report and the Written Opinion of the International Searching Authority, or the Declaration for International Application No. PCT/US2012/023191 (May 2, 2012).
"SATA-IO: Enabling the Future," http://www.sata-io-org/sata_io_newsletter_022009.htm, pp. 1-3 (Feb. 2009).
"CFast™," Specification Revision 1.1, Draft B, CompactFlash Association, pp. i-iv and 1-28 (Oct. 7, 2010).
"SATA Power Management: It's Good to be Green," www.serialata.org, pp. 1-4 (Apr. 8, 2009).

* cited by examiner

*Primary Examiner* — Thuan Du
(74) *Attorney, Agent, or Firm* — Jenkins, Wilson Taylor & Hunt, P.A.

(57) ABSTRACT

Methods, systems, and non-transitory computer readable media for advanced power management for serial advanced technology attachment (SATA)-based storage devices are disclosed. According to one aspect, the subject matter described herein includes a method for advanced power management of SATA-based storage devices. The method includes, at a SATA-based storage device having a controller, a non-volatile memory for storing data, and a communication interface for communicating with a host, receiving from the host a command to enter a quiescent mode. In response to receiving the command to enter a quiescent mode, the storage device enters a quiescent mode. The storage device receives from the host an indication that the storage device should enter a low power mode. In response to this indication, the storage device puts at least a portion of the non-volatile memory into a low power mode while maintaining at least a portion of the controller in normal power mode. The storage device optionally puts a physical layer interface of the storage device into a low power mode for additional power savings.

43 Claims, 6 Drawing Sheets

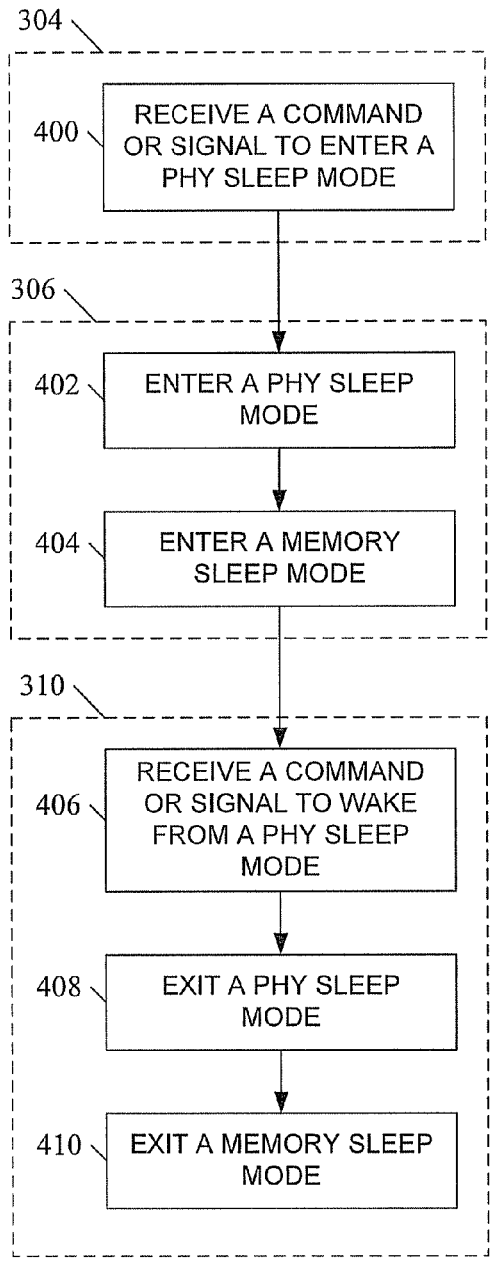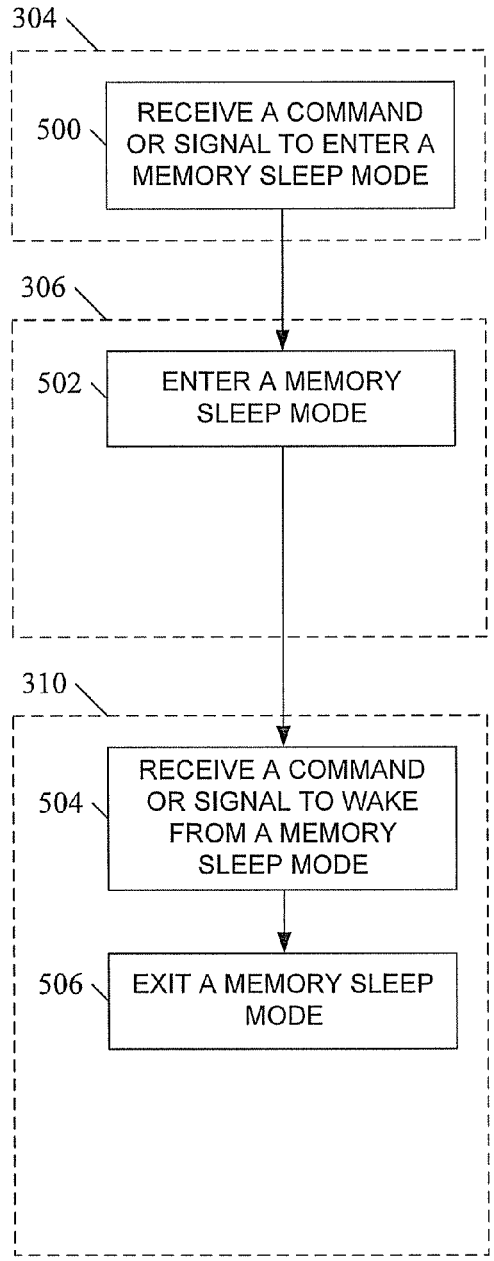
FIG. 4
FIG. 5

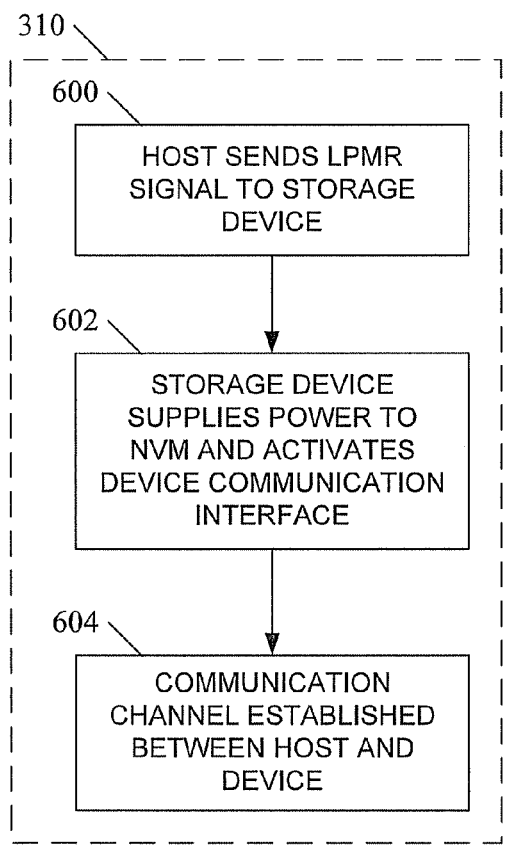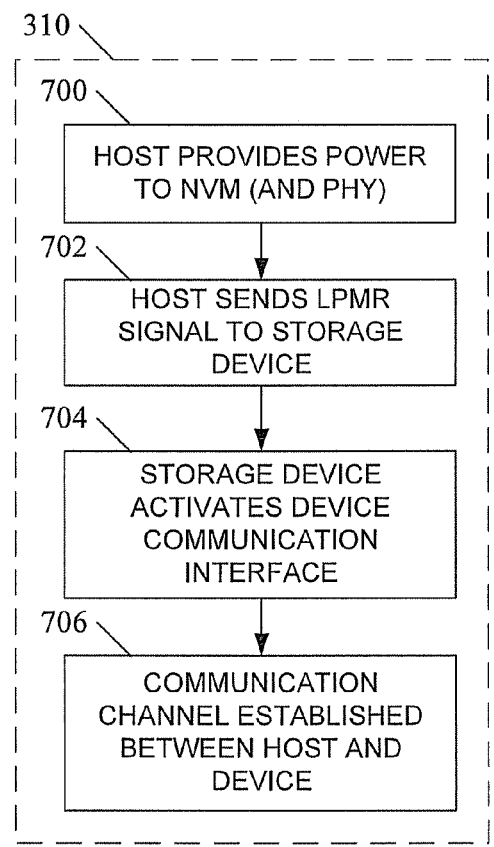
FIG. 6
FIG. 7

METHODS, SYSTEMS, AND COMPUTER READABLE MEDIA FOR ADVANCED POWER MANAGEMENT FOR SERIAL ADVANCED TECHNOLOGY ATTACHMENT (SATA)-BASED STORAGE DEVICES

TECHNICAL FIELD

The subject matter described herein relates to power management of storage devices. More particularly, the subject matter described herein relates to methods, systems, and computer readable media for advanced power management for serial advanced technology attachment (SATA)-based storage devices.

BACKGROUND

Memory storage devices, data storage devices, memory devices, memories, and storage devices, are hereinafter referred to simply as "storage devices". Example storage devices include removable devices, such as memory cards, and non-removable devices, such as embedded memory. Embedded devices and removable devices that are attached to a host are powered on and use power even when they are not accessed by the host. In some systems, such as cameras and cell phones, short periods of activity are followed by long periods of inactivity. The idle time power has a large impact on the total amount of energy used by such a device in a battery operated environment, and hosts usually have strict limits on the maximum allowed idle power consumption of a memory device.

Data storage devices that comply with the SATA specifications must support low power modes. Two such modes are the SATA SLUMBER and PARTIAL SLUMBER modes, which place the SATA interface into a low power mode, after which the storage device finishes any necessary processing and flash memory management activities before entering what is referred to as deep power down mode, or DPDM. In this mode, the controller's processor and the flash memories are idle until the host brings the SATA interface back into regular mode. It takes 10 microseconds to recover from PARTIAL SLUMBER mode and 10 milliseconds to recover from SLUMBER mode.

One disadvantage of the SATA SLUMBER modes is that both modes require out of band (OOB) commands to return to normal operation. The SATA physical interface, or "PHY", has to be partially powered up to accept these commands, which results in significant power consumption even in SLUMBER mode. This power consumption is a problem for embedded SATA devices, because the DPDM power consumption (e.g., 10 mW) is still higher than the limit that many host device manufacturers specify (e.g., 1 mW.)

One conventional solution to this problem is to turn off power to the memory after a period of inactivity on the host interface and to turn power on again when a command is received. This method has no coordination with the host, and causes unexpected response delays when a command was received while power to the memory is off. This method is less useful now, because modern memory in multiple die products like solid state drives (SSDs) and compact flash (CF) takes a long time to re-initialize, e.g., in the order of tens or even hundreds of milliseconds. Such unexpected delays are no longer acceptable to hosts expecting high performance.

Another conventional solution to this problem is described in the CFast standard specification (available from http://www.compactflash.org/), which contains a protocol called physical layer sleep (PHYSLP) that enables the storage device to turn off its PHY. The way that the PHYSLP protocol operates is that the host asserts a hardware signal to the storage device telling the storage device that it may turn off its PHY completely, to save power. The host may turn off its own PHY also at the same time, doubling the power savings. Before the host tries to access the storage device again, the host de-asserts this signal; the storage device is required to turn on its PHY within a predefined time limit (10 milliseconds in the v1.0 CFast specification). This method also has disadvantages, however. While the PHY of a storage device may consume a certain amount of power, the amount of power being consumed by the memory within the storage device is more and more significant as memory capacities increase. The PHYSLP protocol does not address or reduce power consumption of the memory within the storage device, but only addresses power consumption by the PHY of the storage device.

Accordingly, in light of these disadvantages associated with conventional solutions to the problem of how to reduce power consumption by un-accessed memory storage devices, there exists a need for methods, systems, and computer readable media for advanced power management for SATA-based storage devices.

SUMMARY

According to one aspect, the subject matter described herein includes a method for advanced power management of SATA-based storage devices. The method includes, at a SATA-based storage device having a controller, a non-volatile memory for storing data, and a communication interface for communicating with a host, receiving from the host a command to enter a quiescent mode. In response to receiving the command to enter a quiescent mode, the storage device enters a quiescent mode. The storage device receives from the host an indication that the storage device should enter a low power mode. In response to this indication, the storage device puts at least a portion of the non-volatile memory into a low power mode while maintaining at least a portion of the controller in normal power mode. The storage device optionally puts a physical layer interface of the storage device into a low power mode for additional power savings.

As used herein, the term "low-power mode" refers to any mode that uses less power than a normal operation mode, and may be a condition where activity is reduced or stopped entirely within some or all of a component, or where power is reduced or removed entirely to some or all of a component.

According to another aspect, the subject matter described herein includes a system for advanced power management of SATA-based storage devices. The system includes a SATA-based storage device having a controller, a non-volatile memory for storing data, and a communication interface for communicating with a host. In response to receiving from the host a command to enter a quiescent mode, the storage device enters a quiescent mode. In response to receiving from the host an indication that the storage device should be put into a low power mode, the storage device puts at least a portion of the non-volatile memory into a low-power mode while maintaining at least a portion of the controller in normal power mode. The storage device optionally puts a physical layer interface of the storage device into a low power mode for additional power savings.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which:

FIG. 4 is a flow chart illustrating in detail an exemplary process for advanced power management for SATA-based storage devices according to an embodiment of the subject matter described herein;

FIG. 5 is a flow chart illustrating in detail an exemplary process for advanced power management for SATA-based storage devices according to another embodiment of the subject matter described herein;

FIG. 6 is a flow chart illustrating in detail an exemplary process for advanced power management for SATA-based storage devices according to an embodiment of the subject matter described herein;

FIG. 7 is a flow chart illustrating in detail an exemplary process for advanced power management for SATA-based storage devices according to an embodiment of the subject matter described herein.

DETAILED DESCRIPTION

In accordance with the subject matter disclosed herein, methods, systems, and computer readable media are provided for advanced power management for serial advanced technology attachment (SATA)-based storage devices.

Reference will now be made in detail to exemplary embodiments of the present invention, examples of which are illustrated in the accompanying drawings. Wherever possible, the same reference numbers will be used throughout the drawings to refer to the same or like parts.

Figure 1A:
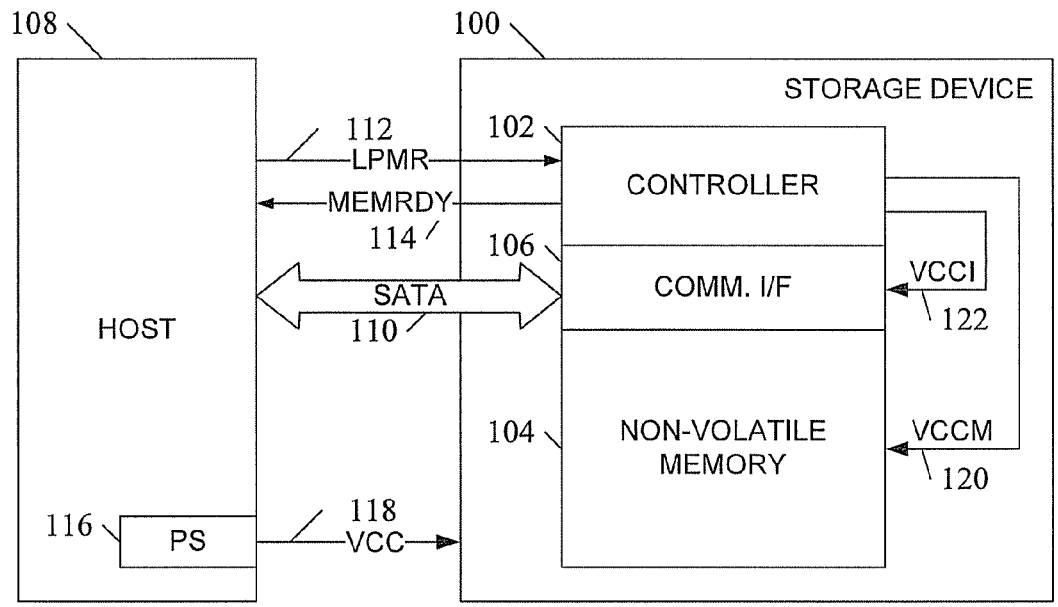
FIGS. 1A and 1B are block diagrams illustrating exemplary systems for advanced power management for SATA-based storage devices according to embodiments of the subject matter described herein.
Figure 1B:
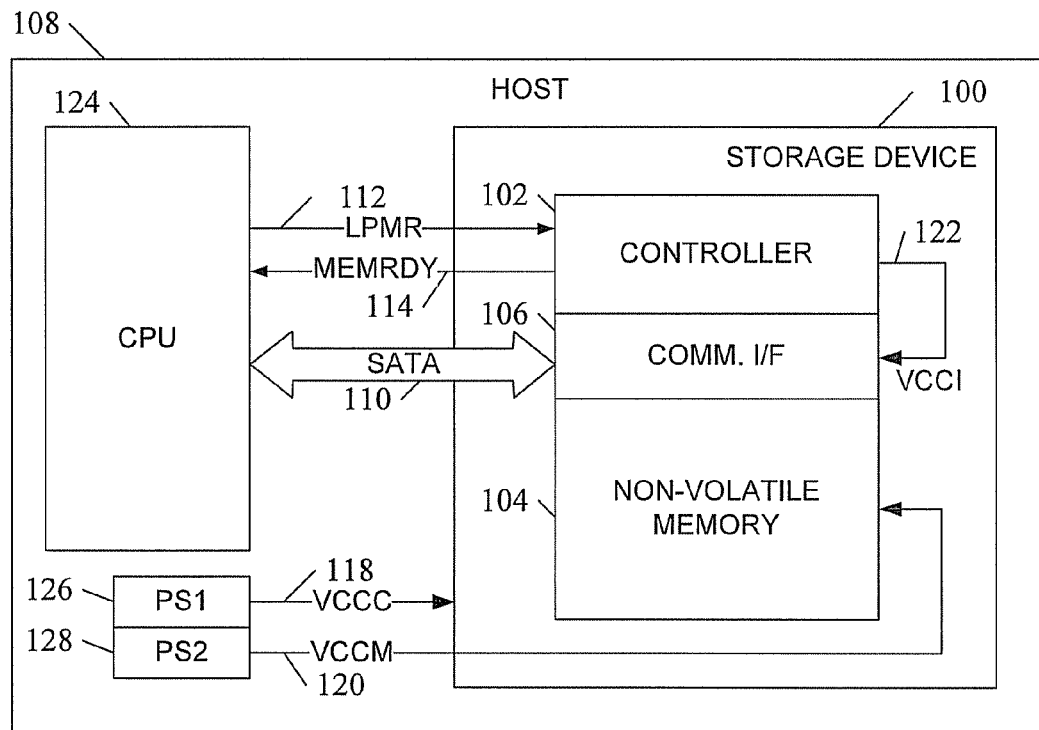

FIGS. 1A and 1B are block diagrams illustrating exemplary systems for advanced power management for SATA-based storage devices according to embodiments of the subject matter described herein.

FIG. 1A illustrates an embodiment in which a removable storage device is attached to a host. In the embodiment illustrated in FIG. 1A, a SATA-based storage device 100 includes a controller 102, a non-volatile memory (NVM) 104 for storing data and a communication interface 106 for communicating with a host 108. Examples of storage device 100 include, but are not limited to, a hard disk drive (HDD), a solid state drive (SSD), and other electromechanical and/or rotating memory storage devices. In one embodiment, the communication interface may include a SATA communications interface 110.

In one embodiment, storage device 100 may include input and/or output pins separate from communication interface 106. In the embodiment illustrated in FIG. 1A, storage device 100 includes a signal input pin 112 for receiving a signal from host 108 and a signal output pin 114 for sending a signal to host 108. In the embodiment illustrated in FIG. 1A, host 108 uses signal input pin 112 as a low-power mode request (LPMR) signal, and storage device 100 uses signal output pin 114 as a memory ready (MEMRDY) signal to indicate to host 108 the state of the non-volatile memory array, i.e., whether or not the NVM is ready for use. As will be described in more detail below, the presence of LPMR 112 and MEMRDY 114 signals allows storage device 100 to provide additional power savings by reducing or removing power to communication interface 106. On the other hand, if the low-power mode entered by storage device 100 maintains power to communication interface 106, LPMR 112 and MEMRDY 114 signals are not required, but may be optionally included or used.

In one embodiment, host 108 may provide power to storage device 100 but storage device 100 controls power to the various components within storage device 100. In the embodiment illustrated in FIG. 1A, for example, a power supply (PS) 116 within host 108 provides power VCC 118 to storage device 100, and controller 102 within storage device 100 controls power to communication interface 106 and NVM 104 separately, e.g., via separate power supply buses VCCM 120, which supplies power to NVM 104, and VCCI 122, which supplies power to communication interface 106.

Power control of NVM 104 may include the ability to control portions of the memory and associated circuitry independently. For example, if NVM 104 includes flash memory, or includes a solid state drive (SSD), it may be possible to reduce power to some of all of a flash memory array separately from power to the read/write channels, controller 102, or other component of storage device 100. Likewise, if NVM 104 includes a hard disk drive, disk array, storage array, or other electromechanical, rotating, or magnetic media, power control of NVM 104 may include the ability to slow or stop individual spindles, to idle or park some or all of the read/write heads, etc.

FIG. 1B illustrates an embodiment in which an embedded or non-removable storage device is attached to or integrated with a host. Examples of embedded storage devices include the integrated solid state drive (iSSD) produced by SanDisk, Incorporated. In the embodiment illustrated in FIG. 1B, SATA-based storage device 100 includes controller 102, NVM 104, and communication interface 106 for communicating with a central processing unit (CPU) 124 within host 108. Like the embodiment illustrated in FIG. 1A, communication interface 106 may include SATA bus interface 110, signal input pin 112 and signal output pin 114. In contrast to the embodiment illustrated in FIG. 1A, however, in FIG. 1B host 108 provides and controls power to various components within storage device 100. In the embodiment illustrated in FIG. 1B, a first power supply PS1 126 provides power to the storage device core via power supply bus 118, now called "VCCC", and a second power supply PS2 128 provides VCCM 120 to the NVM 104. In the embodiment illustrated in FIG. 1B, controller 102 still controls VCCI 118 to communication interface 106, but in an alternative embodiment, host 108 may directly control VCCI as well. The subject matter herein is not limited to the embodiments illustrated in FIGS. 1A and 1B. As will be described in more detail below, how and by which entity the separate power supplies are controlled will affect the sequence of events that occur during entry into and exit from low-power mode.

Figure 2:
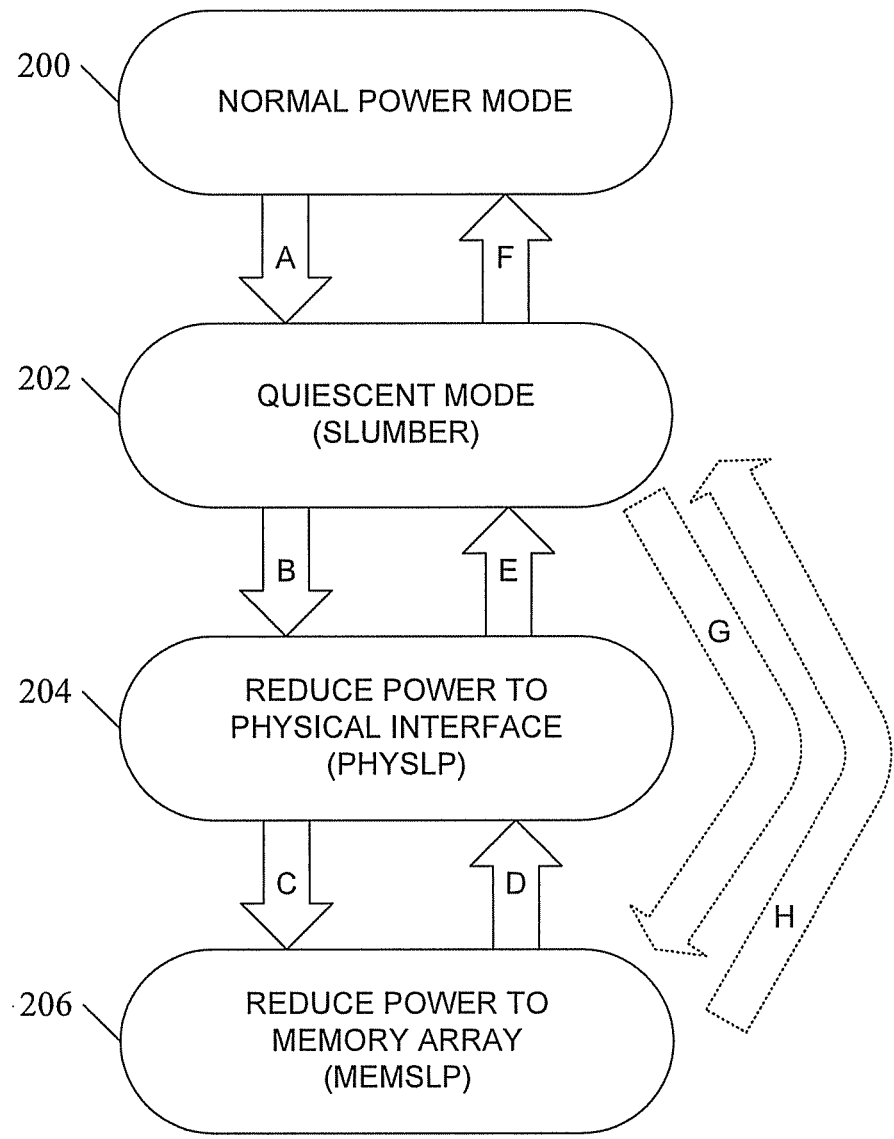
FIG. 2 is a state diagram illustrating power consumption states of a SATA-based storage device that implements an exemplary process for advanced power management for SATA-based storage devices according to an embodiment of the subject matter described herein.

FIG. 2 is a state diagram illustrating power consumption states of a SATA-based storage device that implements an exemplary process for advanced power management for SATA-based storage devices according to an embodiment of the subject matter described herein. State 200 is a normal power mode where, for example, storage device 100 provides full power to non-volatile memory 102 and communication interface 106. In SATA parlance, this is known as the physical layer ready (PHYRDY) mode.

State 202 is a quiescent mode where, for example, storage device 100 stops accepting I/O requests. For SATA devices, this mode may be entered by receipt of a SATA SLUMBER command from a host. This change of state is indicated by arrow A in FIG. 2.

In state 204, power to the physical layer is reduced or removed completely. Conventional storage devices, however, typically maintain power to other parts of the storage device, such as the non-volatile memory array of a NAND flash memory, for example. In CFast-compliant devices, for example, this mode is referred to as physical layer sleep mode, or PHYSLP, and the host signals the storage device to enter this mode via manipulation of the card detect input (CDI) pin, which is an input pin into the storage device. This change of state is indicated by arrow B in FIG. 2.

In state 206, power to all or part of the non-volatile memory is reduced to provide additional power savings. This additional power saving mode is not defined by SATA or CFast, and is herein referred to as a memory sleep mode, or MEMSLP. This change of state is indicated by arrow C in FIG. 2.

The process of exiting low power modes and returning to a normal power mode is referred to as "waking" the storage device. The transition from MEMSLP mode 206 to PHYSLP mode 204 is indicated by arrow D in FIG. 2. The transition from PHYSLP mode 204 to SLUMBER mode 202 is indicated by arrow E in FIG. 2. In CFast-compliant devices, this transition is triggered by manipulation of the CDI pin. The transition from SLUMBER mode 202 to normal or PHYRDY mode us indicated by arrow F in FIG. 2.

In an alternative embodiment, a storage device may maintain power to the physical layer interface but reduce power to the non-volatile memory. In this embodiment, the storage device may transition directly from SLUMBER mode 202 to MEMSLP mode 206 and back, shown in FIG. 2 as arrows G and H, respectively. In embodiments where both the physical layer and the memory array will be powered down, the storage device may perform these two steps in any order. For example, rather than using the above-described sequence of normal mode 200 to quiescent mode 202 to PHYSLP mode 204 to MEMSLP mode 206, a storage device may transition from normal mode 200 to quiescent mode 202, to MEMSLP mode 206, and then to PHYSLP mode 204, and may likewise return to normal mode by waking up the PHY before the memory, or vice versa.

Figure 3:
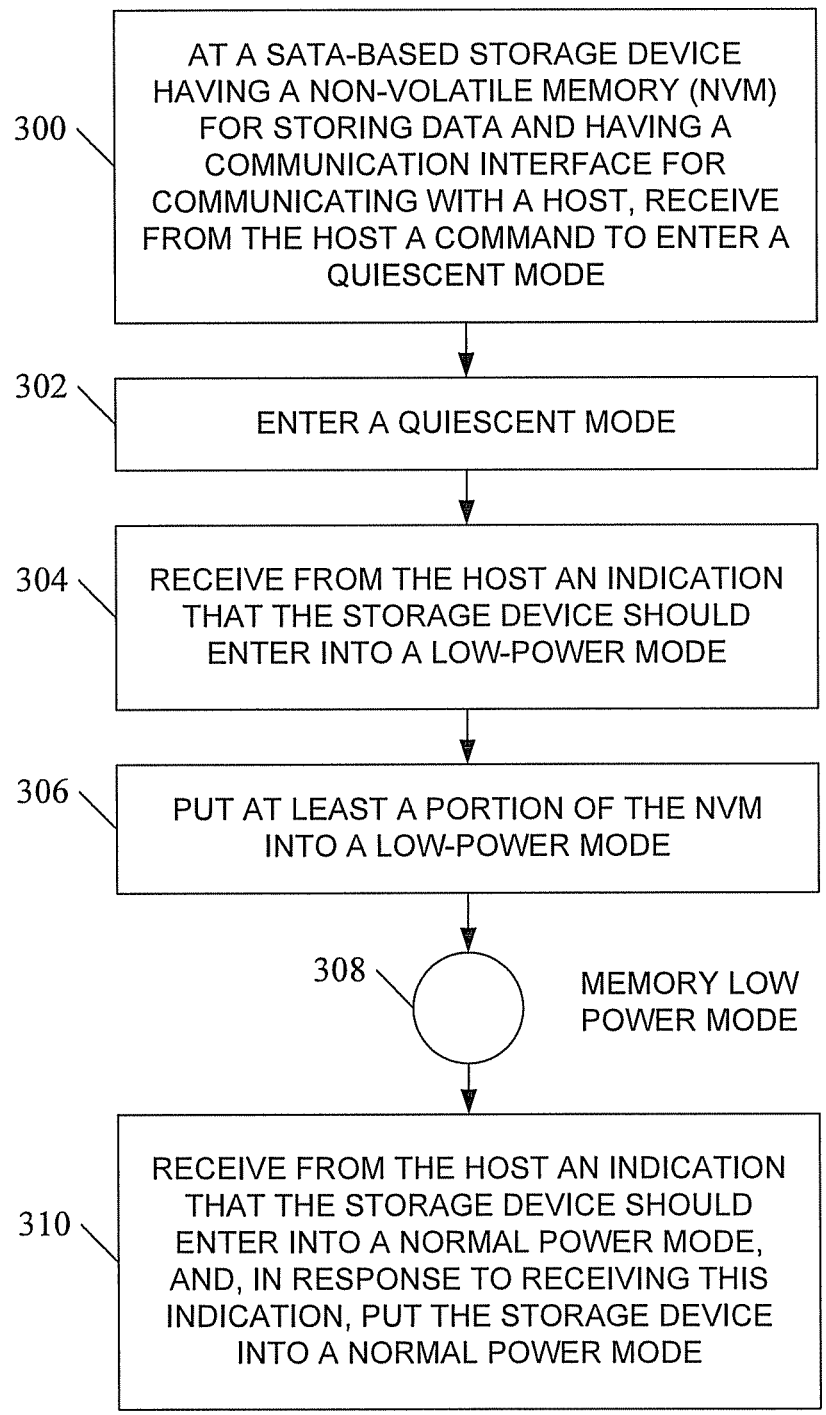
FIG. 3 is a flow chart illustrating exemplary processes for advanced power management for SATA-based storage devices according to an embodiment of the subject matter described herein.

FIG. 3 is a flow chart illustrating exemplary processes for advanced power management for SATA-based storage devices according to an embodiment of the subject matter described herein. These process will now be explained with reference to FIGS. 1A and 1B.

At block 300, a SATA-based storage device having a controller, a non-volatile memory for storing data, and a communication interface for communicating with a host receives from the host a command to enter a quiescent mode, and in response, at block 302, the storage device enters a quiescent mode. For example, referring to the embodiment illustrated in FIG. 1A, storage device 100 may receive a SATA SLUMBER command from host 108, and in response, storage device 100 may enter a SATA SLUMBER mode.

At block 304, storage device 100 receives from host 108 an indication that storage device 100 should enter into a low-power mode. The indication from host 108 that storage device 100 should enter a low-power mode can take many forms, and, based on the particular form, the type of low-power mode to be entered and the specific steps taken by storage device 100 to enter that low-power mode may vary. Some examples will be described below and in FIGS. 4 and 5.

At block 306, in response to receiving the indication that it should enter a low-power mode, storage device 100 enters a memory low-power mode, in which at least a portion of non-volatile memory 104 is in a low-power mode while at least a portion of controller 102 is maintained in normal power mode. By maintaining at least a portion of controller 102 in a normal power mode, storage device 100 may maintain information about its own state prior to entering the low-power mode at the request of host 108. This allows storage device 100 to resume operation quickly after normal power mode is restored. For example, controller 102 does not have to wait for the non-volatile memory to become fully operational so that it can read state information from the NVM before proceeding. System configuration information, information about communication channels and entities that were using them, and other information may be maintained and accessed by controller 102 so that storage device 100 can exit low-power mode and become fully operational more quickly than it would if this information had to first be restored from NVM 104 before storage device 100 could operate in normal mode.

In one embodiment, storage device 100 may prepare to enter a memory low-power mode by flushing buffers and caches, moving data from volatile memory into non-volatile memory, other housekeeping tasks, and so on. For HDDs, this preparation may include parking read/write heads, spinning down the spindles, etc.

In one embodiment, storage device 100 may indicate to the host that some or all of NVM 104 is ready to enter the low-power mode, or alternatively, has entered the low-power mode. In the embodiments illustrated in FIGS. 1A and 1B, storage device 100 may signal this condition by changing the state of an signal output pin, such as MEMRDY pin 114, to a logic value that host 108 recognizes as indicating that storage device 100, or at least some of NVM 104, is ready to enter the low-power mode (e.g., in embodiments where host 108 controls power to NVM 104, as in FIG. 1B) or has entered the low-power mode (e.g., in embodiments where storage device 100 controls power to NVM 104, as in FIG. 1A.)

Thus, at block 308, storage device 100 enters a memory low-power mode, in which at least some of the non-volatile memory is in a low-power mode and at least some of the controller is in normal power mode. In one embodiment, memory low-power mode is a memory sleep (MEMSLP) mode.

At block 310, storage device 100 receives from host 108 an indication that storage device 100 should enter into a normal power mode, and, in response, storage device 100 is put into a normal power mode. The sequence by which storage device 100 exits memory low-power mode and returns to normal power mode may vary according to the type of low-power mode entered, whether or not communication interface 106 is powered up or down, and by which entity, storage device 100 or host 108, has control of the power supplies to the various components within storage device 100. Some examples will be described below and in FIGS. 6 and 7.

In one embodiment, storage device 100 may send to host 108 an indication that NVM 104 has returned to a normal power mode. In the embodiments illustrated in FIGS. 1A and 1B, for example, storage device 100 may signal this condition by changing the state of MEMRDY 114 to a logic value that host 108 recognizes as indicating that NVM 104 is in normal power mode, e.g., that NVM 104 has exited MEMSLP mode (and PHYSLP mode, in embodiments where storage device 100 enters PHYSLP mode before entering MEMSLP mode.)

FIG. 4 is a flow chart illustrating in detail an exemplary process for advanced power management for SATA-based storage devices according to an embodiment of the subject matter described herein. FIG. 4 illustrates in detail the steps that may be performed in blocks 304, 306, and 310 of FIG. 3.

Receiving from the host an indication that the storage device should enter a low power mode (block 304 of FIG. 3), may include, at block 400, receiving a command or signal from host 108 instructing storage device 100 to enter a physical layer sleep mode, such as PHYSLP or a mode in which communication interface 106 is powered down. For example, this may be a command received by storage device 100 via communication interface 106, it may be a signal sent via a signal input such as the low-power mode request (LPRM) signal 112, some other type of indication, or a combination of the above. For CFast-compliant storage devices, for example, the connection detect input (CDI) pin may perform the function of LPRM 112, with host 108 using CDI to instruct storage device 100 to enter PHYSLP mode.

Putting at least a portion of the NVM into a low-power mode while maintaining at least a portion of the controller in normal power mode (block 306 of FIG. 3), may include, at block 402, entering a PHY sleep mode, e.g., putting communication interface 106 into a low-power mode, followed by, at block 404, entering a memory sleep mode, e.g., putting at least a portion of NVM 104 into a low-power mode while maintaining power to controller 102. In an alternative embodiment, the steps of block 404 may be performed before the steps of block 402, i.e., entering a memory sleep mode first, followed by entering a PHY sleep mode. In yet another alternative embodiment, storage device 100 may ignore the instruction to enter PHY sleep mode entirely and only perform the steps of block 404 without performing the steps of block 402.

Referring back to block 402, in the embodiment illustrated in FIG. 1A, for example, controller 102 may reduce the voltage provided to communication interface 106 via VCCI 118. In an alternative embodiment, host 108 may control power to communication interface 106 directly, in which case host 108 may cause storage device 100 to enter PHY sleep mode by reducing the voltage supplied to communication interface 106.

Referring back to block 404, in the embodiment illustrated in FIG. 1A, for example, where storage device 100 controls how power is provided to NVM 104, controller 102 may reduce power to (or remove power entirely from) some or all of NVM 104. Where the entire NVM 104 is placed into a low-power mode, for example, controller 102 may reduce the voltage provided to NVM 104 via VCCM 120. Other configurations may allow portions of NVM 104 to be controlled independently from each other. For example, one portion of NVM 104 may be powered down while another portion of NVM 104 may remain at full power. In the embodiment illustrated in FIG. 1B, for example, where host 108 controls power to NVM 104 directly, host 108 may cause storage device 100 to enter memory sleep mode by reducing the voltage supplied by PS2 128 and provided to NVM 104 via VCCM 120.

The wake-up sequence described in block 310 of FIG. 3 may include, at block 406, receiving a command or signal to wake from a PHY sleep mode. In embodiments where the PHY has been put to sleep, this indication may be a signal received via an input pin other than communication interface 106, e.g., a change of state of LPMR 112. At block 408, the PHY exits a PHY sleep mode and returns to normal mode. For example, storage device 100 may supply power to communication interface 106, and may additionally establish a communication channel with host 108. In embodiments where the PHY has not been put to sleep, this indication may be a command sent from host 108 and received by storage device 100 via command interface 106, and the steps of block 408 are unnecessary. At block 410, storage device 100 exits a memory sleep mode. For example, in the embodiment illustrated in FIG. 1A, controller 102 may restore power to NVM 104, and in the embodiment illustrated in FIG. 1B, host 108 may restore power to NVM 104, e.g., by supplying power to NVM 104 via PS2 128.

FIG. 5 is a flow chart illustrating in detail an exemplary process for advanced power management for SATA-based storage devices according to another embodiment of the subject matter described herein. FIG. 5 illustrates in detail the steps that may be performed in blocks 304, 306, and 310 of FIG. 3.

Receiving from the host an indication that the storage device should enter a low power mode (block 304 of FIG. 3), may include, at block 500, receiving a command or signal to enter a memory sleep mode. The indication may be a command received from host 108 via communication interface 106. Even though in this embodiment the physical layer is not being instructed to go into low power mode, the indication may be via a signal input separate from communication interface 106, such as LPMR 112.

Putting at least a portion of the NVM into a low-power mode while maintaining at least a portion of the controller in normal power mode (block 306 of FIG. 3), may include, at block 502, entering a memory sleep mode, in which at least a portion of NVM 104 is put into a low power mode while at least a portion of controller 102 in normal power mode. Although storage device 100 may not have received an explicit instruction to put the PHY into low-power mode as well, in an alternative embodiment storage device 100 may do this anyway, if host 106 has some means other than the PHY to signal storage device 100 when it is time to return to normal power mode.

The wake-up sequence described in block 310 of FIG. 3 may include, at block 504, receiving a command or signal to exit a memory sleep mode. This indication may be a command from host 108 received by storage device 100 via communication interface 106, or a signal input separate from communication interface 106, such as LPMR 112. At block 506, storage device 100 exits the memory sleep mode. This may entail restoring power to NVM 104, either by storage device 100, as illustrated in FIG. 1A, or by host 108, as illustrated in FIG. 1B. In embodiments where the PHY was also put to sleep and where the indication to exit the memory sleep mode was via a signal pin separate from the PHY, the instruction to wake the memory from sleep mode may also serve to wake the PHY.

FIG. 6 is a flow chart illustrating in detail an exemplary process for advanced power management for SATA-based storage devices according to an embodiment of the subject matter described herein. FIG. 6 illustrates in detail the steps that may be performed during the wake-up sequence (block 310 of FIG. 3) in an embodiment where storage device 100 controls the power NVM 104 and communication interface 106, and where the memory low-power mode also includes putting the PHY into a PHY sleep mode. Since the PHY is in low-power mode, communication interface 106 is inoperative, so host 106 uses an input signal separate from communication interface 106, such as LPMR 112, to indicate to storage device 100 that storage device 100 should enter a normal power mode, e.g., to exit the MEMSLP and PHYSLP modes.

Thus, at block 600, host 108 uses LPMR 112 to indicate to storage device 100 that it should wake and return to normal power mode. This indication may include setting LPMR 112 to a logical level, using LPMR 112 as a serial input port, or other means known in the art. In response to receiving this indication, at block 602, storage device 100 supplies power to NVM 104 and activates communication interface 106, in any order or simultaneously. At block 604, a communication channel is established between storage device 100 and host 108, e.g., a SATA communication channel over communication interface 106.

FIG. 7 is a flow chart illustrating in detail an exemplary process for advanced power management for SATA-based storage devices according to an embodiment of the subject matter described herein. FIG. 7 illustrates in detail the steps that may be performed during the wake-up sequence (block 310 of FIG. 3) in an embodiment where host 108 controls the power NVM 104 and communication interface 106, and where the memory low-power mode also includes putting the PHY into a PHY sleep mode. Since host 108 controls power to both NVM 104 and communication interface 106, in one embodiment, at block 700, host 108 first provides power to NVM 104 and communication interface 106 before using LPMR 112 to signal storage device 100 to return to normal power mode. Providing power to NVM 104 causes it to exit low-power mode. At block 704, storage device 100 activates communication interface 106, which is typically in a reset state following a power-on condition, and at block 706, a communication channel is established between host 108 and device 100 via the activated communication interface 106.

Figure 8:
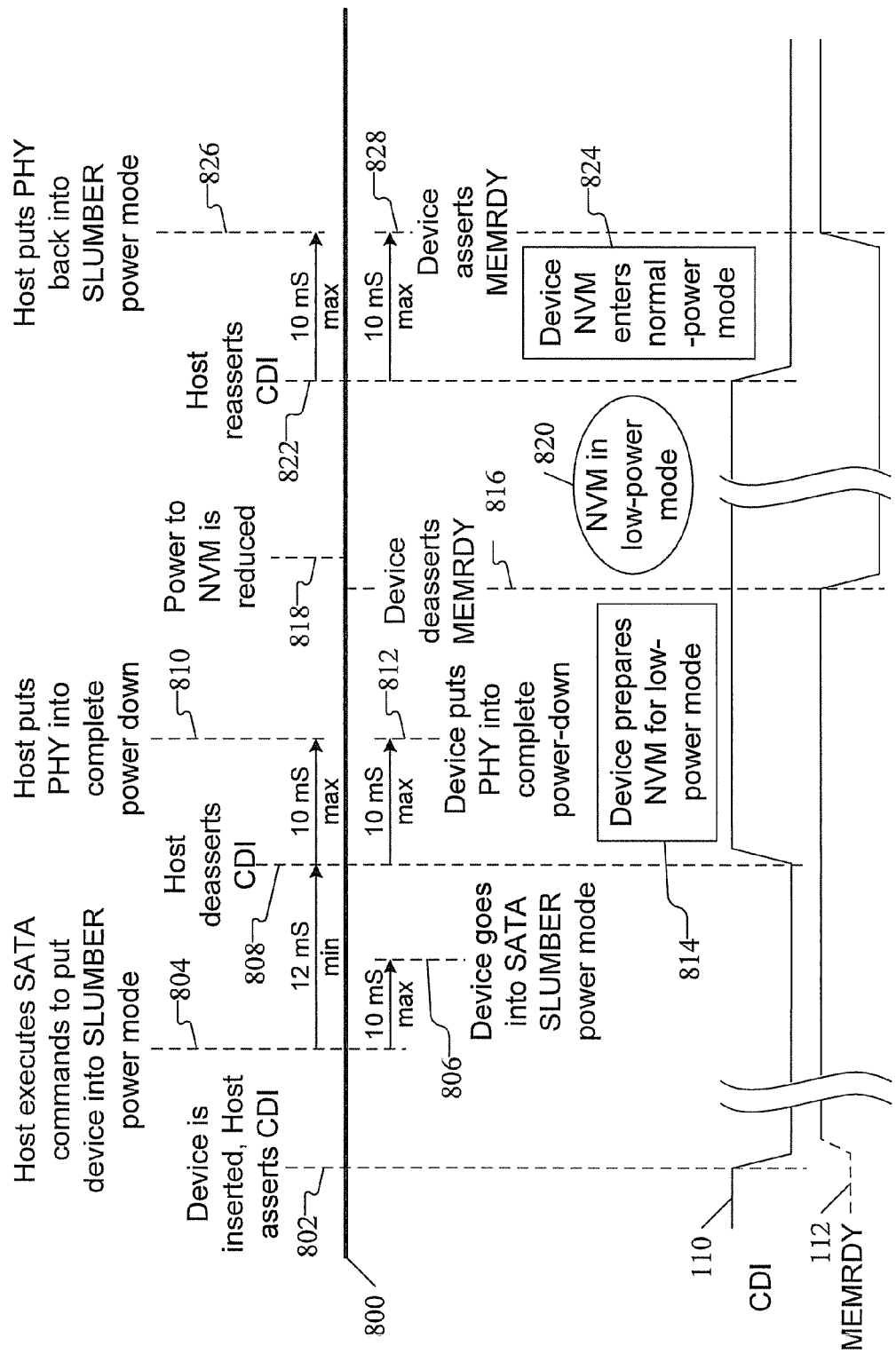
FIG. 8 is a timing diagram showing a timeline for an exemplary process for advanced power management for SATA-based storage devices according to an embodiment of the subject matter described herein.

FIG. 8 is a timing diagram showing a timeline for an exemplary process for advanced power management for SATA-based storage devices according to an embodiment of the subject matter described herein. In the embodiment illustrated in FIG. 8, the methods described herein are adapted for use by a memory that complies with the CompactFlash Association's "CFast" specification. The CFast specification defines an interface between a host and a CFast compatible device. That interface includes a connection detect input (CDI) signal, which, along with the connection detect out (CDO) signal, is conventionally used by the host to detect the presence or absence of a removable memory card. As will be shown in detail in FIG. 8, the CDI signal is also used to indicate to a CFast-compliant storage device that it should enter or exit a PHYSLP mode. Thus, the CDI signal performs the functions of the low-power mode request (LPMR) signal shown in FIG. 1A. The MEMRDY signal 114, which is not defined by the CFast specification, is used by the storage device to indicate to the host the operational status of the memory, e.g., whether it is fully operational or in a memory sleep mode.

In FIG. 8, a timeline 800 is used to plot events that occur related to signals CDI, which is sent from a host to a storage device, and MEMRDY, which is sent from the storage device to the host. FIG. 8 will now be described with reference also to the system illustrated in FIG. 1A, but the operations illustrated in FIG. 8 may also be applied to the system illustrated in FIG. 1B.

At event 802, storage device 100 is inserted into or otherwise connected to host 108, which asserts the CDI 112 signal. Since CDI 112 is active low, host 108 asserts CDI 112 by changing CDI 112 from a logical one value to a logical zero value. Storage device 100 may take some time to power-up and initialize, and therefore some time after the transition of CDI 112, MEMRDY 114, which is active high, will initialize to logical one.

At event 804, host 108 executes SATA commands to put storage device 100 into SATA SLUMBER mode. In response, at event 806, device 100 goes into SATA SLUMBER power mode. CFast-compliant devices must do this within 10 mS of receiving the SATA SLUMBER command from the host.

At event 808, host 108 de-asserts CDI 112 by setting it to a logical one, and at event 810, host 108 puts its physical layer interface, or PHY, into low-power mode. In the embodiment illustrated in FIG. 8, host 108 puts its PHY into complete power down mode. CFast-compliant hosts must do this within 10 mS of de-assertion of CDI 112. At event 812, storage device 100 puts its PHY into a low-power mode in response to detection of the de-assertion of CDI 112. In the embodiment illustrated in FIG. 8, storage device 100 puts its PHY into complete power down mode also. CFast-compliant storage devices enter a PHYSLP mode and must do this within 10 MS of de-assertion of CDI 112. In an alternative embodiment, host and storage device may put their respective PHYs into a low-power mode rather than a complete power down mode.

At event 814, storage device 100 prepares a portion (which may be some or all) of its non-volatile memory to be put into memory low-power mode. At event 816, storage device 100 indicates to host 108 that the portion of NVM 104 is ready to be put into memory low-power mode by changing MEMRDY 114 to a logical zero.

At event 818, power to NVM 104 is reduced, either under control of storage device 100 or under control of host 108, and at event 820, the selected portion of NVM 104 within storage device 100 is in low-power mode. This low-power mode, which is referred to as "MEMSLP", is not defined in the CFast specification. In embodiments where storage device 100 rather than host 108 controls power to NVM 104, MEMRDY 114 going to logical zero may indicate that memory low-power mode has already occurred.

Some time later, at event 820, host 108 reasserts CDI 112, which signals to storage device 100 that it should exit PHYSLP mode. For the embodiment illustrated in FIG. 4, this also has the effect of causing storage device 100 to exit MEMSLP mode as well, and at event 824 storage device 100 returns to normal-power mode.

At event 826, host 108 causes its PHY to power up, which exits PHYSLP mode, but host 108 and storage device 100 remain in SATA SLUMBER mode, however. CFast-compliant devices must transition from PHYSLP mode to SATA SLUMBER mode within 10 mS of reassertion of CDI 112.

At event 828, storage device indicates to host 108 that NVM 104 is in normal power mode by re-asserting MEMRDY 114, e.g., by changing MEMRDY 114 to a logical one. In one embodiment, NVM 104 must transition to a ready mode within 10 mS from the reassertion of CDI 112, which will be indicated by the assertion of MEMRDY 114. Following event 828, both host 108 and storage device 100 may execute PHY initialization state machine sequences as specified by SATA.

Thus, as illustrated in FIG. 8, the methods and systems for advanced power management of serial advanced technology attachment (SATA)-based storage devices may be used to supplement existing protocols that provide for the reduction of power to the PHY of a storage device by adding the additional capability of reducing power to some or all of the non-volatile memory within the storage device. The subject matter described herein provides an advantage over conventional systems in that the power reduction to the memory is coordinated between the storage device and the host. This enables the host to optimally reduce power consumption while providing a predictable wakeup time. The storage device has the added advantage that it will have the time it needs to finish flushing its caches and executing necessary flash management operations with the confidence that power will be supplied to the memories as long as required and as controlled by the device. An extra power saving comes from the host, where turning off its own PHY and disabling power supplies to the memory device reduce its own power consumption.

As described above, in one embodiment CDI 112 may be used by host 108 to signal storage device 100 to enter a PHYSLP mode, and MEMRDY 114 is a signal used by storage device 100 to indicate to host 108 whether its non-volatile memory is ready for use or not. In one embodiment, host 108 may monitor the value of MEMRDY 114 as a means to determine whether and when storage device 100 entered into a low-power mode as requested, and may likewise monitor MEMRDY 114 to determine whether and when storage device 100 exited the low-power mode and returned to a normal power mode. In alternative embodiments, however, host 108 may ignore the value of MEMRDY 114 (and storage device 100 may not even provide MEMRDY 114), but instead assume that storage device 100 performs as expected. For example, a CFast-compliant device must enter SATA SLUMBER mode no later than 10 mS after receiving a SATA SLUMBER command and must put its PHY into low-power mode no later than 10 mS after the host de-asserts CDI. A CFast-compliant host must activate its PHY no later than 10 mS after it re-asserts CDI, and a CFast-compliant storage device may be presumed to have the same requirements. Thus, rather than relying on MEMRDY 114 to determine the status of storage device 100, host 108 may make assumptions about the status of storage device 100 based on required timings. Alternatively, a host may make assumptions based on required timings but verify those assumptions by monitoring MEMRDY 114.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for advanced power management of serial advanced technology attachment (SATA)-based storage devices, the method comprising:
   at a SATA-based storage device having a controller, a non-volatile memory for storing data, and a communication interface for communicating with a host:
      receiving from the host a command to enter a quiescent mode;
      in response to receiving the command to enter a quiescent mode, entering a quiescent mode;
      receiving from the host an indication that the storage device should enter a low power mode; and
      in response to receiving the indication that the storage device should enter a low power mode, putting at least a portion of the non-volatile memory into low power mode while maintaining at least a portion of the controller in normal power mode.

2. The method of claim 1 wherein the SATA-based storage device comprises at least one of a solid state drive (SSD), a hard disk drive (HDD), and an electromechanical rotating memory storage device.

3. The method of claim 1 wherein receiving a command to enter a quiescent mode comprises receiving a SATA SLUMBER command and wherein entering a quiescent mode comprises entering a SATA SLUMBER mode.

4. The method of claim 1 wherein receiving from the host an indication that the storage device should enter a low power mode comprises receiving an indication that the non-volatile memory should be put into a low power mode.

5. The method of claim 4 wherein receiving an indication that the non-volatile memory should be put into a low power mode comprises at least one of:
   receiving, via the command interface, a command to put the non-volatile memory into a low power mode; and
   receiving, via a signal other than the command interface, a signal indicating that non-volatile memory should be put into a low power mode.

6. The method of claim 1 wherein receiving from the host an indication that the storage device should enter a low power mode comprises receiving an indication that the physical layer interface of the storage device should be put into a low power mode.

7. The method of claim 6 wherein receiving an indication that the physical layer interface of the storage device should be put into a low power mode comprises at least one of:
   receiving, via the command interface, a command to put the physical layer interface into a low power mode; and
   receiving, via a signal other than the command interface, a signal indicating that physical layer interface should be put into a low power mode.

8. The method of claim 1 comprising sending to the host an indication that the at least a portion of the non-volatile memory is ready to be put into a low power mode.

9. The method of claim 8 wherein sending to the host an indication that the at least a portion of the non-volatile memory is ready to be put into a low power mode comprises at least one of:
   sending, via the command interface, a message indicating that the at least a portion of the non-volatile memory is ready to be put into a low power mode; and
   sending, via a signal other than the command interface, a signal indicating that the at least a portion of the non-volatile memory is ready to be put into a low power mode.

10. The method of claim 1 wherein the low power mode comprises a memory sleep (MEMSLP) mode.

11. The method of claim 1 wherein putting the at least a portion of the non-volatile memory into a low-power mode comprises at least one of:
   reducing the power supplied to the storage device; and
   reducing the power supplied to the at least a portion of the non-volatile memory.

12. The method of claim 1 wherein at least another portion of the non-volatile memory remains at full power.

13. The method of claim 1 comprising putting the physical layer interface into a low power mode.

14. The method of claim 13 wherein the low power mode comprises a physical layer interface sleep (PHYSLP) mode.

15. The method of claim 1 comprising receiving an indication from the host that the storage device should return to normal power mode.

16. The method of claim 15 wherein receiving an indication that the storage device should return to normal power mode comprises at least one of:
   receiving, via the command interface, a command to return the storage device to normal power mode; and
   receiving, via a signal other than the command interface, a signal indicating that storage device should return to normal power mode.

17. The method of claim 15 comprising returning the storage device to a normal power mode.

18. The method of claim 17 wherein returning the storage device to a normal power mode comprises setting the non-volatile memory to a normal power mode.

19. The method of claim 17 comprising setting the physical layer interface to a normal power mode.

20. The method of claim 17 comprising sending to the host an indication that the storage device is in a normal power mode.

21. The method of claim 20 wherein sending to the host an indication that the storage device is in a normal power mode comprises at least one of:
   sending, via the command interface, a message indicating that the storage device is in a normal power mode; and
   sending, via a signal other than the command interface, a signal indicating that the storage device is in a normal power mode.

22. A system for advanced power management of serial advanced technology attachment (SATA)-based storage devices, the system comprising:
   a SATA-based storage device having a controller, a non-volatile memory for storing data, and a communication interface for communicating with a host, wherein the storage device is configured to:
   receive from the host a command to enter a quiescent mode;
   in response to receiving the command to enter a quiescent mode, enter a quiescent mode;
   receive from the host an indication that the storage device should enter a low power mode; and
   in response to receiving the indication that the storage device should enter a low power mode, put at least a portion of the non-volatile memory into memory low power mode while maintaining at least a portion of the controller in normal power mode.

23. The system of claim 22 wherein the SATA-based storage device comprises at least one of a solid state drive (SSD), a hard disk drive (HDD), and an electromechanical rotating memory storage device.

24. The system of claim 22 wherein the command to enter a quiescent mode comprises a SATA SLUMBER command and wherein entering a quiescent mode comprises entering a SATA SLUMBER mode.

25. The system of claim 22 wherein the communication interface comprises a SATA communication interface.

26. The system of claim 22 the indication that the storage device should enter a low power mode comprises an indication that the non-volatile memory should be put into a low power mode.

27. The system of claim 26 wherein the indication that the non-volatile memory should be put into a low power mode comprises at least one of:
   a command, received via the command interface, to put the non-volatile memory into a low power mode; and
   a signal, other than the command interface, indicating that non-volatile memory should be put into a low power mode.

28. The system of claim 22 the indication that the storage device should enter a low power mode comprises an indication that the physical layer interface of the storage device should be put into a low power mode.

29. The system of claim 28 wherein the indication that the physical layer interface of the storage device should be put into a low power mode comprises at least one of:
   a command, received via the command interface, to put the physical layer interface into a low power mode; and
   a signal, other than the command interface, indicating that physical layer interface should be put into a low power mode.

30. The system of claim 22 wherein the storage device is configured to send to the host an indication that the at least a portion of the non-volatile memory is ready to be put into a low power mode.

31. The system of claim 30 wherein the indication that the at least a portion of the non-volatile memory is ready to be put into a low power mode comprises at least one of:
   a message, sent via the command interface, indicating that the at least a portion of the non-volatile memory is ready to be put into a low power mode; and
   a signal, other than the command interface, indicating that the at least a portion of the non-volatile memory is ready to be put into a low power mode.

32. The system of claim 22 wherein the memory low power mode comprises a memory sleep (MEMSLP) mode.

33. The system of claim 22 wherein putting the at least a portion of the non-volatile memory into a memory low-power mode comprises at least one of:
   reducing the power supplied to the storage device; and
   reducing the power supplied to the at least a portion of the non-volatile memory.

34. The system of claim 22 wherein at least another portion of the non-volatile memory remains at full power.

35. The system of claim 22 wherein the storage device is configured to put the physical layer interface into a physical layer interface (PHY) low power mode.

36. The system of claim 35 wherein the PHY low power mode comprises a physical layer interface sleep (PHYSLP) mode.

37. The system of claim 22 wherein the storage device is configured to:
   receive an indication from the host that the storage device should return to normal power mode; and
   in response to receiving the indication from the host that the storage device should return to normal power mode, return to normal power mode.

38. The system of claim 37 wherein the indication that the storage device should return to normal power mode comprises at least one of:
   a command, received via the command interface, to return the storage device to normal power mode; and
   a signal other than the command interface, indicating that storage device should return to normal power mode.

39. The system of claim 37 wherein returning to a normal power mode comprises setting the non-volatile memory to a normal power mode.

40. The system of claim 39 comprising setting the physical layer interface to a normal power mode.

41. The system of claim 37 wherein the storage device is configured to send to the host an indication that the storage device is in a normal power mode.

42. The system of claim 41 wherein the indication that the storage device is in a normal power mode comprises at least one of:
- a message, sent via the command interface, indicating that the storage device is in a normal power mode; and
- a signal other than the command interface indicating that the storage device is in a normal power mode.

43. A non-transitory computer readable medium having stored thereon executable instructions that when executed by the processor of a computer control the computer to perform steps comprising:
- at a SATA-based storage device having a controller, a non-volatile memory for storing data, and a communication interface for communicating with a host:
  - receiving from the host a command to enter a quiescent mode;
  - in response to receiving the command to enter a quiescent mode, entering a quiescent mode;
  - receiving from the host an indication that the storage device should enter a low power mode; and
  - in response to receiving the indication that the storage device should enter a low power mode, putting at least a portion of the non-volatile memory into low power mode while maintaining at least a portion of the controller in normal power mode.

* * * * *